United States Patent [19]

Weber

[11] Patent Number: 4,940,539

[45] Date of Patent: Jul. 10, 1990

[54] GREASE TRAP CONSTRUCTION

[75] Inventor: Myer M. Weber, Milwaukee, Wis.

[73] Assignee: Semco Laboratories, Inc., Milwaukee, Wis.

[21] Appl. No.: 348,868

[22] Filed: May 8, 1989

[51] Int. Cl.[5] .............................. C02F 3/02; E03F 5/16
[52] U.S. Cl. ..................................... 210/149; 210/184;
210/207; 210/538; 210/539; 210/608; 210/632
[58] Field of Search ............... 210/149, 187, 207, 220,
210/256, 521, 538, 539, 608, 632; 435/262, 264,
271, 839

[56] References Cited

U.S. PATENT DOCUMENTS

| | | | |
|---|---|---|---|
| 350,181 | 10/1886 | Ackerson | 210/539 |
| 2,759,557 | 8/1956 | Gordon | 210/538 |
| 2,935,197 | 5/1960 | Marple | 210/149 |
| 3,476,250 | 11/1969 | Fifer | 210/220 |
| 3,506,582 | 4/1970 | Gertzman | 210/632 |
| 3,617,538 | 11/1971 | Bogert | 210/612 |
| 3,734,850 | 5/1973 | Karr | 210/220 |
| 4,288,545 | 9/1981 | Spraker | 210/632 |
| 4,666,606 | 5/1987 | Heinicke | 210/632 |
| 4,670,149 | 6/1987 | Francis | 210/608 |
| 4,797,208 | 1/1989 | Miller et al. | 210/632 |
| 4,810,385 | 3/1989 | Hater et al. | 210/610 |

FOREIGN PATENT DOCUMENTS 62-298496 12/1987 Japan .

Primary Examiner—W. Gary Jones
Assistant Examiner—Christopher Upton
Attorney, Agent, or Firm—Andrus, Sceales, Starke & Sawall

[57] ABSTRACT

A grease trap construction comprising a housing having an inlet to receive waste water containing grease and foreign material and having an outlet. An air conduit having a plurality of outlet ports spaced along its length is located in the lower end of the housing and is connected to a source of air under pressure, so that air will be discharged through the ports into contact with the waste water. The waste water within the housing is heated by an electric heating element which is immersed in the waste water and the heating element is controlled by a thermostat to maintain the temperature of the waste water within a given range. An aqueous composition containing a mixture of enzymes and bacterial spores is introduced into the housing into contact with the waste water. The enzymes and bacterial spores act on the grease, fats and other material in the waste water to provide a substantial reduction in total solids and an increase in soluble solids, as well as a substantial reduction in the BOD level of the waste water.

15 Claims, 1 Drawing Sheet

4,940,539

GREASE TRAP CONSTRUCTION

Background of the Invention

It has been the common practice in restaurants, meat and poultry processing plants, slaughterhouses, and other industries having excessive amounts of greasy wastes to incorporate a grease trap or separator in the waste water discharge line. In many cases, the grease trap is of insufficient capacity to fully separate the grease and foreign materials, while in other cases the grease trap may not be properly cleaned or maintained, with the result that inadequate removal of grease and foreign materials is obtained.

With the growing need for pollution abatement, increased attention has been given to methods of waste treatment to provide improved grease removal. The overtaxing of municipal sewage treatment facilities has become a serious problem in many communities and ordinances requiring a reduction in the volume of grease and insoluble solids discharged into municipal sewers are becoming more popular and stringent.

In an effort to improve the separation and collection of grease in foreign materials, it has been proposed to utilize a grease trap having a series of compartments, including an inlet compartment, an intermediate compartment, and an outlet compartment. Waste water is introduced into the inlet compartment, flows beneath the outlet compartment to the intermediate compartment, and then passes through flow control ports to the outlet compartment. A removable screen is located in the outlet compartment in the flow path of the waste. With this construction, the waste water passes through a tortuous path, with lighter than water material being collected as a floating layer in the inlet chamber, while heavier than water materials are collected in the intermediate compartment. In addition, grease and other foreign materials are collected on the screen that is located in the outlet compartment. However, grease traps of this type require frequent or daily cleaning to remove the collected materials. If the grease trap is not properly maintained, grease and other materials will pass directly through the trap and offensive odors can be generated, which are particularly objectionable when the grease trap is used in a restaurant or fast food establishment. Further, the cleaning of a grease trap is an unpleasant task, and with a restaurant or fast food establishment, is normally carried out in off-hours, so that the cleaning operation, as well as the odors, will not be offensive to customers.

SUMMARY OF THE INVENTION

The invention is directed to an improved grease trap construction, in which an aqueous composition containing a mixture of enzymes and aerobic bacterial spores are introduced into the trap and maintained under precise temperature conditions to thereby stimulate enzyme and bacteria growth so that the enzymes and bacteria will attack the waste and provide a substantial reduction in total solids in the waste water, as well as substantially reducing the BOD level.

In accordance with the invention, the grease trap comprises a housing having an inlet to receive waste water containing grease and foreign materials and having an outlet in the lower end, which is positioned out of direct alignment with the inlet. An aqueous composition containing a mixture of enzymes and aerobic bacterial spores is introduced into the housing into contact with the waste water. The liquid composition preferably contains a mixture of enzymes, such as proteases, amylases, lipases, and cellulases, which are in solution in the composition, while the bacterial spores are suspended in the aqueous carrier.

To provide the optimum conditions for enzyme activity and bacterial growth, the waste water in the housing is heated to a temperature generally in the range of 70° F. to 85° F. by an electric heating element which is controlled by a standard thermostat. In addition, air is introduced into the housing into contact with the waste water through an air conduit, which is located on the bottom surface of the housing and contains a plurality of outlet ports which are spaced along the length of the conduit. The conduit is connected to an air pump or other source of air under pressure, so that air will be introduced into the waste water to provide the desired aerobic atmosphere for growth of the bacterial spores. The enzymes act on the grease, fats, as well as the cellulosic and proteinaceous materials, in the waste water to provide a substantial reduction in total insoluble solids of the waste water, and a resultant substantial reduction in the BOD level.

With the construction of the invention, the insoluble solids content of the waste water is reduced to acceptable levels so that daily cleaning of the grease trap is not required. As the grease and other waste materials are substantially solubilized, clogging of the drain line is greatly reduced thus reducing potential plumbing and maintenance charges.

The construction of the invention also eliminates offensive odors that are associated with a conventional grease trap and eliminates the unpleasant daily or periodic task of cleaning of the trap.

Other objects and advantages will appear in the course of the following description.

DESCRIPTION OF THE DRAWINGS

The drawing illustrates the best mode presently contemplated of carrying out the invention.

In the drawing:

DESCRIPTION OF THE ILLUSTRATED EMBODIMENT

Figure 1:
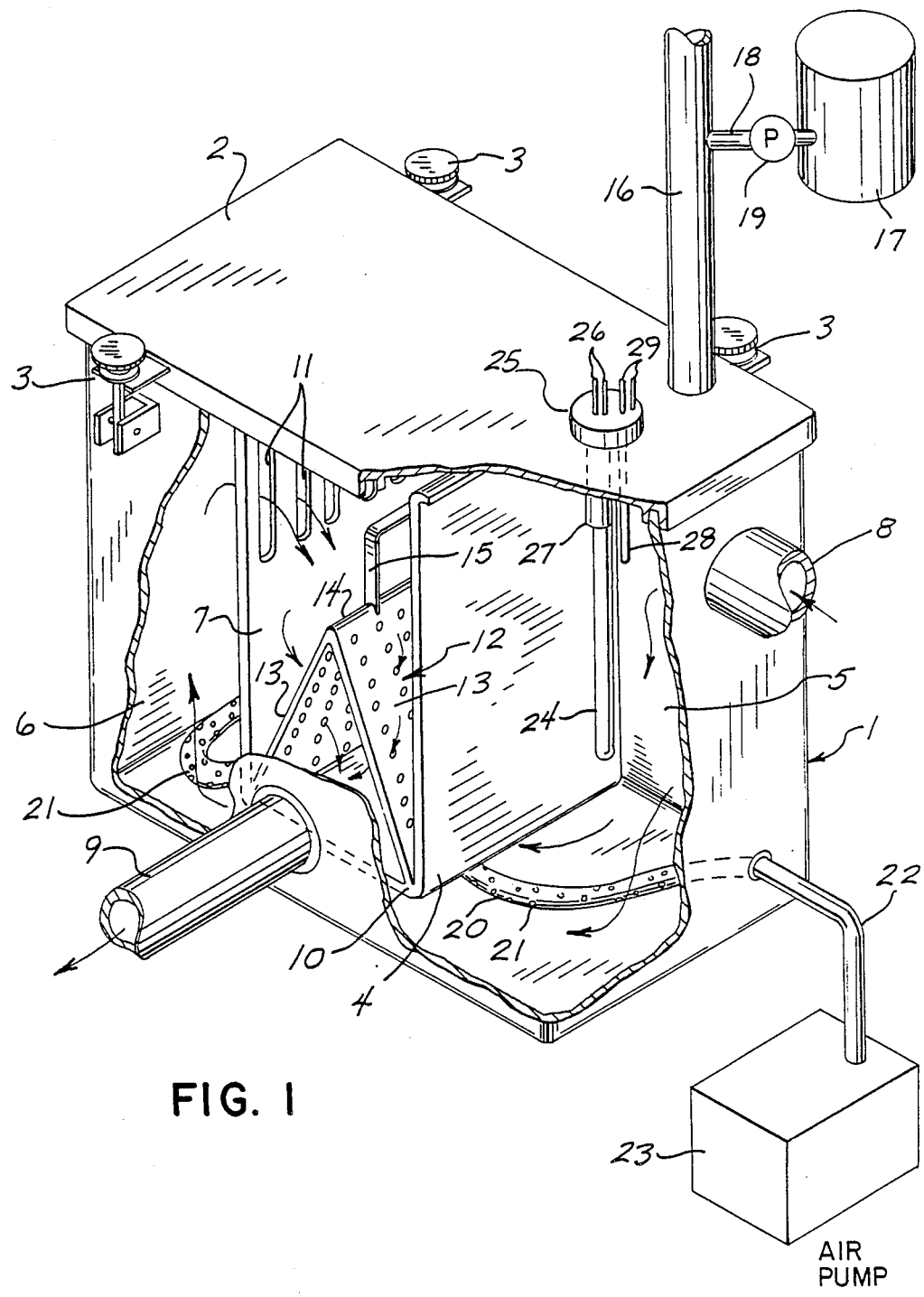
FIG. 1 is a perspective view with parts broken away showing the grease tap of the invention.

FIG. 1 depicts the grease trap of the invention, including an open top housing 1, preferably formed of steel, cast iron, or other metal, and a lid 2 encloses the open top of the housing and is locked to the housing by a series of fasteners 3.

A generally U-shaped divider 4 is located within housing 1 and divides the housing into an inlet chamber 5, an intermediate chamber 6, and an outlet chamber 7 that is located between inlet chamber 5 and intermediate chamber 6. An inlet 8 which receives waste water containing grease and foreign materials communicates with inlet chamber 5, while an outlet 9 is connected to the lower end of the outlet chamber 7. With this arrangement, waste water entering the inlet 8 flows downwardly within inlet chamber 5 beneath the bottom 10 of divider 4 to chamber 6. The waste water then flows upwardly within chamber 6 through a plurality of flow control slots 11 and into the outlet chamber 7.

Mounted within chamber 7 is an inverted V-shaped screen 12 composed of a pair of screen sections 13 which are joined together along their upper edges at an apex 14. A handle 15 is connected to apex 14 to enable the screen to be removed for cleaning when the lid 2 is removed from the housing 1. The waste water flowing into outlet chamber 7 passes through screen 12 and is discharged through the outlet 7.

Vent pipe 16 is mounted within an opening in lid 2 and serves to vent gases generated within the housing 1.

In accordance with the invention, a container or tank 17 is located outside of housing 1 and contains an aqueous enzyme and bacterial spore composition. The composition can be similar to that described in copending U.S. Pat. application Ser. No. 07/321,320 filed Mar. 10, 1989, and entitled Composition and Method For Treating Waste Material. In general, the liquid composition contains a mixture of enzymes such as proteases, amylases, lipases and cellulases, along with aerobic bacterial spores, such as *Bacillus subtilis*, and an inhibitor, such as an alkylene glycol. The specific formulation of the composition can be as described in the aforementioned patent application, which is incorporated herein by reference.

Container 17 is connected by line 18 to vent pipe 16, and a conventional metering pump 19 is located in line 18. Operation of the metering pump 19 serves to meter the desired amount of the liquid composition into the vent pipe 16 and the liquid composition will then flow by gravity through the vent pipe into contact with the waste water contained within inlet chamber 5.

Alternately, the liquid composition can be introduced in other manners into the inlet chamber as, for example, by the aspirating effect of a water supply line.

To provide the optimum conditions for enzyme and bacterial growth, the waste water in housing 1 is aerated and heated. In this regard, an air conduit 20 is disposed in serpentine fashion on the bottom surface of housing 1 and contains a plurality of outlet holes or ports 21, which are spaced along the length of conduit 20. Conduit 20 extends through a suitable fitting in the wall of housing 1 and is connected through line 22 to the outlet of a standard air pump 23. With this arrangement, air from pump 23 is discharged to conduit 20 and exits through holes 21 into contact with the waste water.

The waste water is heated within a specific temperature range of about 70° F. to 85° F. by an electric heating element 24, which is carried by fitting 25 mounted on lid 2 and the heating element extends downwardly into inlet chamber 5 in contact with the waste water. Leads 26 connect the heating element to a suitable source of electric power. In addition, the upper portion of electric heating element 24, which is located in the vicinity of the upper level of waste water in housing 1, is provided with an insulating coating 27, which will prevent ignition of any grease layer which may have collected on the upper level of the waste water in inlet chamber 5.

Operation of heating element 24 is controlled by a conventional thermostat 28 which is suspended from fitting 25 and is in contact with the waste water. Leads 29 connect the thermostat to the source of power which is connected to element 24.

The feeding of the enzyme and bacterial spore composition to housing 1 can be continuous through operation of metering pump 19, or alternately, can be periodic and controlled by a timer. In either case, the amount of the composition to be added is determined by the requirements of the waste water.

The following table illustrates the treatment analysis for two samples of waste water, A and B, from a restaurant showing the reduction in total solids in waste water that was obtained through the treatment of the invention:

|  | Untreated | Treated | Change (%) |
| --- | --- | --- | --- |
| Total Solids (%) | | | |
| A | 20.0 | 1.82 | 91.4 decrease |
| B | 23.0 | 1.90 | 91.7 decrease |
| Soluble Solids (%) | | | |
| A | 0.30 | 0.52 | 76.6 increase |
| B | 0.33 | 0.58 | 75.7 increase |
| $BOD_5$ (mg/l) | | | |
| A | 95872 | 1560 | 98.3 decrease |
| B | 93680 | 1380 | 98.5 decrease |

In the above table, the two samples A and B of untreated waste water from a restaurant operation were treated in accordance with the invention.

To the treat the waste water, an aqueous composition containing 2,500 protease units per ml, 200 amylase units per ml, 10 lipase units per ml, and 5 cellulase units per ml, and containing 50,000,000 bacterial spores per ml, was metered into a grease trap having a 30 gallon capacity at a rate of 250 per ml/day. The waste water was maintained at a temperature of approximately 80° F. and air was introduced into the waste water at a flow rate of 4 cubic feet/minute.

The table shows that the samples A and B of untreated waste water had a total solids content of 20.0% and 23.0%, respectively, while the treated waste water had a total solids content of 1.81% and 1.90%, respectively, resulting in a decrease of 91.4% and 91.7% in the total solid content for the two samples.

Similarly, the soluble solids content in the waste water was increased through the treatment of the invention by 76.6% and 75.7%, respectively, in the two samples.

Further, the results show that the pH of the waste water was increased from 4.7 to 6.0 and 4.6 to 6.1, respectively, in the two samples, thus providing a more neutral, less corrosive effluent. In addition, the BOD level was decreased by 98.3% and 98.5% in the two samples. Thus, the invention provides a substantial decrease in total solid content in the waste liquid with an increase in soluble solids, an increase in pH and a dramatic decrease in the BOD level.

The apparatus of the invention substantially eliminates the normal cleaning and maintenance of a grease trap, as required in the past. By reducing the total insoluble solid content, the potential clogging of drain lines is minimized, thus resulting in a reduction in plumbing and maintenance charges.

Further, by eliminating the need for daily or periodic cleaning, a distasteful task is eliminated.

Moreover, the apparatus eliminates offensive odors that can be associated with a conventional grease trap and this is of particular importance in a restaurant or fast food establishment.

While the above description has shown the enzyme and bacterial spore composition being automatically metered into the housing, it is contemplated that in certain installations the composition can be introduced manually, either on a daily basis or at other intervals.

Various modes of carrying out the invention are contemplated as being within the scope of the following claims particularly pointing out and distinctly claiming the subject matter which is regarded as the invention.

I claim:

1. A grease trap construction, comprising a housing having an inlet to receive waste water containing grease and foreign material and having an outlet, a screen disposed in said housing between said inlet and said outlet in the flow path of said waste water, said screen being constructed and arranged to collect said grease and foreign material, air supply means for introducing air into the housing into contact with said waste water, heating means disposed in the housing for heating said waste water, temperature control means for operating said heating means and maintaining the temperature of the waste water within predetermined limits, an aqueous composition containing a mixture of enzymes and aerobic bacterial spores, and liquid supply means for supplying said composition into contact with said waste water in the housing.

2. The construction of claim 1, wherein said air supply means comprises a conduit disposed within the housing and having a plurality of outlet ports, and means for supplying air under pressure to said conduit.

3. The construction of claim 2, wherein said conduit is disposed on the bottom surface of said housing.

4. The construction of claim 1, wherein said inlet is located at the upper end of said housing and said outlet is located at the lower end of said housing.

5. The construction of claim 1, wherein said screen includes a pair of screen sections disposed at an acute angle with respect to each other and meeting at an apex, the lower portions of said sections being spaced apart, said outlet communicating with the space between said sections.

6. The construction of claim 5, wherein said screen is removable from said housing.

7. The construction of claim 1, and including a vent pipe communicating with the upper end of said housing and extending upwardly from said housing, said liquid supply means communicating with said vent pipe whereby said composition is introduced into said housing through said vent pipe.

8. The construction of claim 7, wherein said liquid supply means includes a container containing said composition, and means for metering said liquid composition into said vent pipe.

9. The construction of claim 1, wherein said heating means comprises an electric heating element extending generally vertically of said housing, and an insulating layer disposed on the portion of said element that is located in the vicinity of the upper level of waste water in said housing.

10. A grease trap construction, comprising a housing having an open top, a cover to enclose said open top, said housing having an inlet at an upper portion thereof to receive waste water containing grease and foreign material and an outlet at a lower portion thereof, a screen disposed in said housing between said inlet and said outlet in the flow path of said waste water, said screen being constructed and arranged to collect said grease and foreign material, an air conduit disposed within the lower portion of said housing and containing a plurality of outlet ports spaced along the length of said conduit, means for supplying air under pressure to said conduit, said air being discharged through said ports into contact with the waste water therein, heating means disposed in the housing for heating said waste water, temperature control means for operating said heating means and maintaining the temperature of said waste water within predetermined limits, a liquid composition containing a mixture of enzymes and aerobic bacterial spores, and supply means for supplying said composition into contact with the waste water in said housing.

11. The construction of claim 10, wherein said inlet and outlet are disposed out of direct alignment.

12. The construction of claim 10, wherein said housing includes an inlet compartment and an outlet compartment and an intermediate compartment, said inlet communicating with said inlet compartment and said outlet communicating with said outlet compartment, said screen being disposed within said outlet compartment.

13. The construction of claim 10, and including a vent pipe communicating with the upper end said housing and extending upwardly from said housing, said supply means including a container to contain said liquid composition, a supply line connecting said container to said vent pipe, and means for metering said composition through said supply line to said vent pipe.

14. The construction of claim 10, wherein said enzymes are dissolved in said aqueous carrier and are selected from the group consisting of proteases, amylases, lipases, and cellulases.

15. The construction of claim 10, wherein said bacterial spores are a species of *Bacillus subtilis*.

* * * * *